United States Patent [19]

Grillo et al.

[11] Patent Number: 5,067,350
[45] Date of Patent: Nov. 26, 1991

[54] SENSOR TO DETERMINE ROTATIONAL PARAMETERS

[75] Inventors: John M. Grillo, Torrington; James A. Hilby, Watertown; Mark E. La Croix, New Hartford; Mark A. Polinsky, Torrington; Gordon L. Steltzer, Torrington, all of Conn.

[73] Assignee: The Torrington Company, Torrington, Conn.

[21] Appl. No.: 626,423

[22] Filed: Dec. 14, 1990

Related U.S. Application Data

[63] Continuation of Ser. No. 482,694, Feb. 21, 1990, abandoned.

[51] Int. Cl.⁵ .............................................. G01P 1/02
[52] U.S. Cl. ...................................................... 73/494
[58] Field of Search ................ 73/493, 494, 518, 519, 73/520, 530, 532, 866.5; 324/173, 174, 162, 166, 167, 178, 179, 207.25; 310/155, 168

[56] References Cited

U.S. PATENT DOCUMENTS

| | | | |
|---|---|---|---|
| 3,676,765 | 7/1972 | Westcott | 324/174 |
| 3,745,392 | 7/1973 | Phoenix et al. | 324/173 |
| 3,915,266 | 10/1975 | Lantz | 310/168 |
| 3,960,248 | 6/1976 | Tribe | 310/168 |
| 4,027,753 | 6/1977 | Lantz | 310/168 |
| 4,090,592 | 5/1978 | Jovick et al. | 310/168 |
| 4,502,853 | 3/1985 | Ohi | 324/174 |
| 4,586,401 | 5/1986 | Nogle | 324/173 |
| 4,745,363 | 5/1988 | Carr et al. | 324/174 |

Primary Examiner—Robert Raevis
Attorney, Agent, or Firm—Michael H. Minns; Glenn B. Foster

[57] ABSTRACT

A device to determine rotational parameters of a rotatable shaft mounted within a stationary tube comprising a substantially annular shaped target. The target is attached to a rotatable shaft. A target retainer has a bore for receiving the rotatable shaft, and is dimensioned to be securely attached to an interior surface of the tube. The target retainer has a radially extending surface adjacent each axial end of the target to restrain axial movement of the target, and also has an aperture adjacent the outer periphery of the target. A sensor extends into the aperture when the sensor is mounted on the stationary tube. Fasteners connect the sensor to the stationary tube.

16 Claims, 5 Drawing Sheets

SENSOR TO DETERMINE ROTATIONAL PARAMETERS

This application is a continuation of application Ser. No. 482,694, filed Feb. 21, 1990, now abandoned.

BACKGROUND OF THE INVENTION

This invention relates generally to sensors and more particularly to sensors to determine the rotational velocities, positions, and other parameters of rotating shafts and axles for vehicles and other applications.

There are numerous devices which sense the rotation of a shaft. The resolution required for automobile applications has caused the use of add on targets, as compared to measuring the rotation of the shaft itself. In inserting vehicle axles into new or previously assembled differential and axle tube assemblies, the outside diameter of the target must be less than the inside diameter of the axle bearings. This limitation on the size of the target has limited the resolution of the parameter determination.

Another method of sensor fabrication is to insert the target into the tube prior to the connection of the axle shaft to the differential. This requires the insertion of the axle through or past the installed target, while requiring a tight fit between the axle and the inside of the target.

SUMMARY OF THE INVENTION

In one aspect of the present invention, this is accomplished by providing an apparatus for determining parameters of relative rotation of a rotatable shaft mounted within a tube. Attachment means attach a substantially annular shaped target to the shaft to restrain relative rotation and permit axial movement therebetween. Target retaining means restrains axial movement of the target relative to the tube in both axial directions. The target retaining means is securely attached to an inner wall of the tube, and the target is rotatable relative to the target retaining means. A sensor extends through a wall opening formed in the tube. Mounting means mounts the sensor relative to the tube.

The following and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
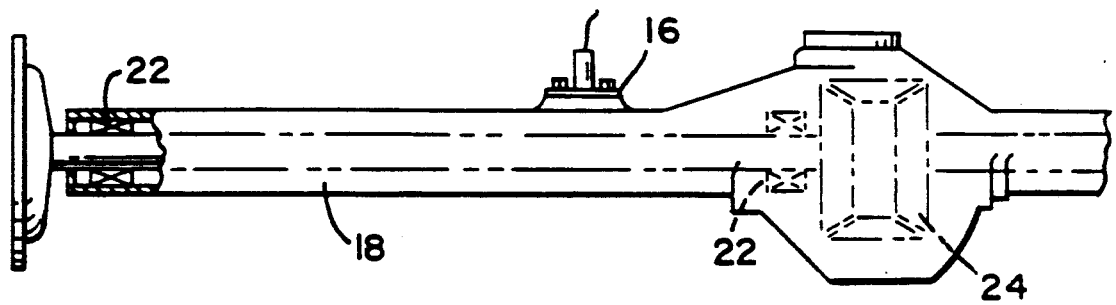
FIG. 1 is partially cut away side view illustrating a vehicle axle assembly including one embodiment of a sensor to determine rotational parameters of shafts and axles for vehicles and other applications.

The apparatus which senses one or more rotational parameters of a shaft or axle is shown generally at 16. The rotational parameters include the speed of the axle 18 or the associated vehicle (shown in the ready to assemble position as 18'), the angular position of the shaft, the acceleration of the shaft, or other related parameters. Apparatus 16 is typically applied to an axle tube 20 of a motor vehicle. An elongated inner tubular wall 21 is formed in the axle tube 20.

The axle 18 is encased, and rotates within, the axle tube 20. The axle is supported by axially spaced bearings 22, and may be driven through a differential 24. The sensing apparatus 16 is mounted between the two bearings 22 such that none of the axle loads are exerted on the apparatus 16.

The apparatus includes a target 26, a target retaining means 28, a funnel 30, and sensor mount 32. A tube recess 34 is formed in the axle tube such that the sensor mount 32 may pass through the recess to be mounted in close proximity to the target.

The target 26 and the axle 18 will, in operation, rotate as one unit such that any motion of the target will provide an accurate indication of the motion or position of the axle 18. A target retention sleeve 36 may be provided to produce a tight, or interference fit between the target 26 and the axle 18. Other retention means may be used between the target and the axle as well.

The target retainer means 28 is fixably attached to an interior surface of the axle tube 20 such that the target retainer 28 will not rotate with respect to the tube while the target retainer means are in the inserted position. An interference fit between the target retainer means 28 and the tube 20 will accomplish this result. A bore 37, which the axle 18 fits through, is formed in the target retainer means 28.

The target has an inner periphery 38, an outer periphery 40, and two end surfaces 42, 44. The target retainer means 28 is in close proximity to, but not in contact with, the outer periphery 40 and the two end faces 42, 44. The target retainer means 28 acts to restrain the target in the correct position along the tube when the axle is being inserted through the bore 37. The spacing between the target 26 and the sensor mount 32 is vital to ensure proper sensing operation.

The construction of the sensor mount 32 is similarly important to ensure proper spacing. Bosses 46 are provided adjacent the tube recess 34 on the outside of the axle tube 20 to provide a mount for the sensor means. A housing 48 permits axial displacement of mount 32. A sensor nut 52 restrains excessive radial motion of mount 32.

A spring 51, acting between the mount 32 and the sensor nut 52 biases the plunger toward the target 26. This biasing action seats a foot portion 54 of the mount 32 into contact with a positioning aperture 56. Since a sensor 58 is located in the foot portion 54, this configuration locates the sensor in close proximity to the target 26 to ensure proper operation.

Figure 9:
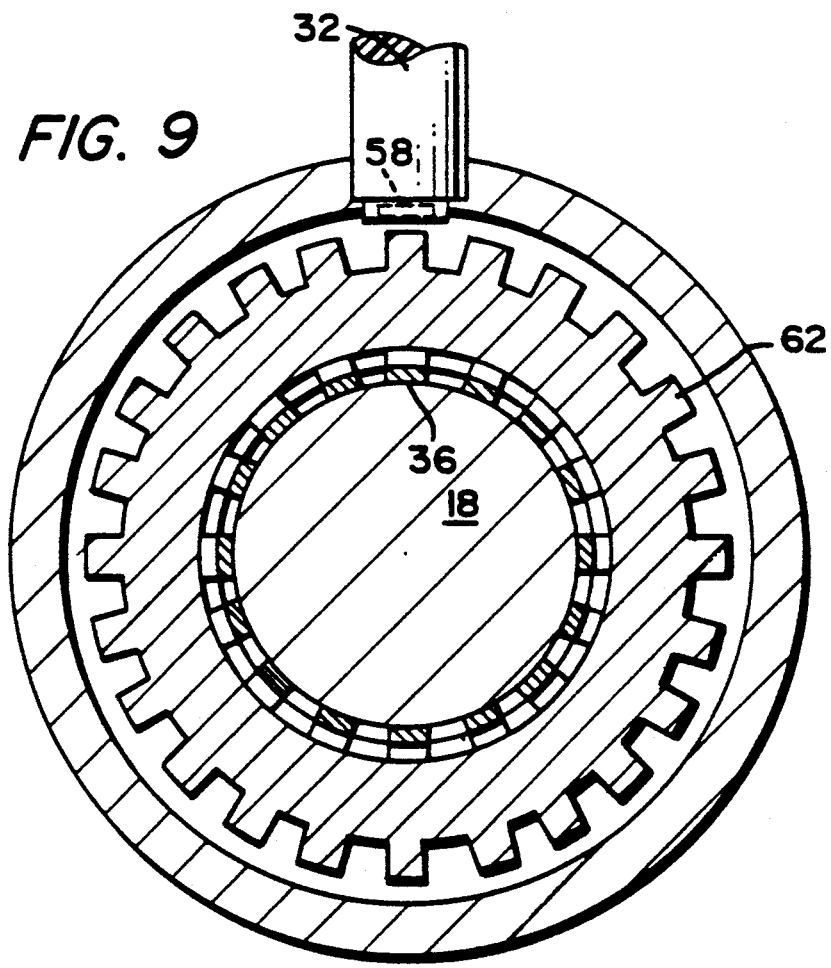
FIG. 9 is an axial view of an alternative embodiment of the instant invention wherein a sensor with a tone wheel has been substituted for the Hall-effect sensor and the target of the prior Figures.

Any well known type of sensor may be used in this application. However, Hall-effect type sensors are especially applicable since these may sense angular motion at very low shaft rotational speeds. Alternately, variable reluctance type sensors may be applied to the instant invention. However, if variable reluctance sensors or Hall-effect gear tooth sensors are used, a tone wheel 62 (see FIG. 9) is typically used in place of the target.

Several funnel 30 and target retainer means 28 configurations are shown in FIGS. 4–8. Each target retainer means restricts axial movement of the target. Each structure permits the insertion of the end of the axle 18 into bore 37. The end of the axle 18 has a chamfer 60 to ease in this insertion.

Figure 4:
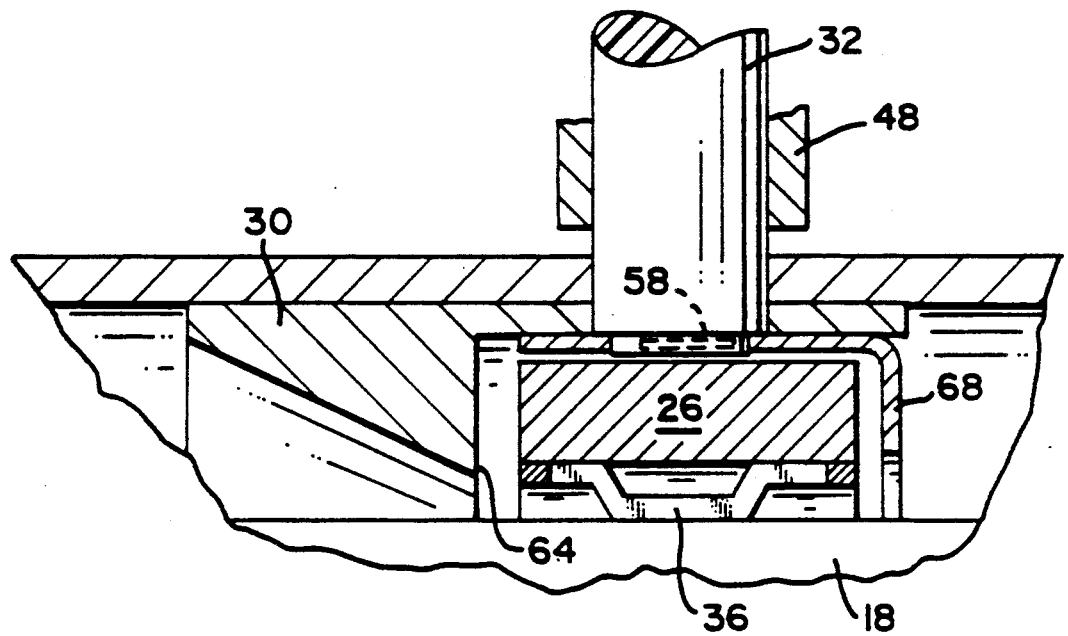
FIGS. 4–8 are cross sectional views of alternate embodiments of portions of the sensor, funnel and target retainer arrangements, similar to that shown in FIG. 2.
Figure 5:
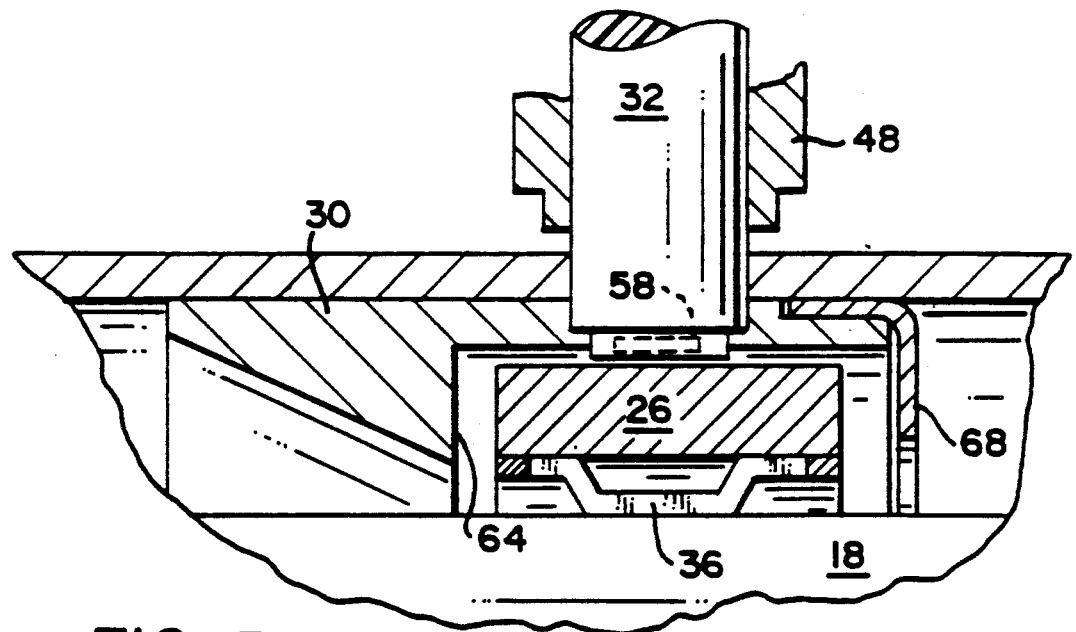
Figure 6:
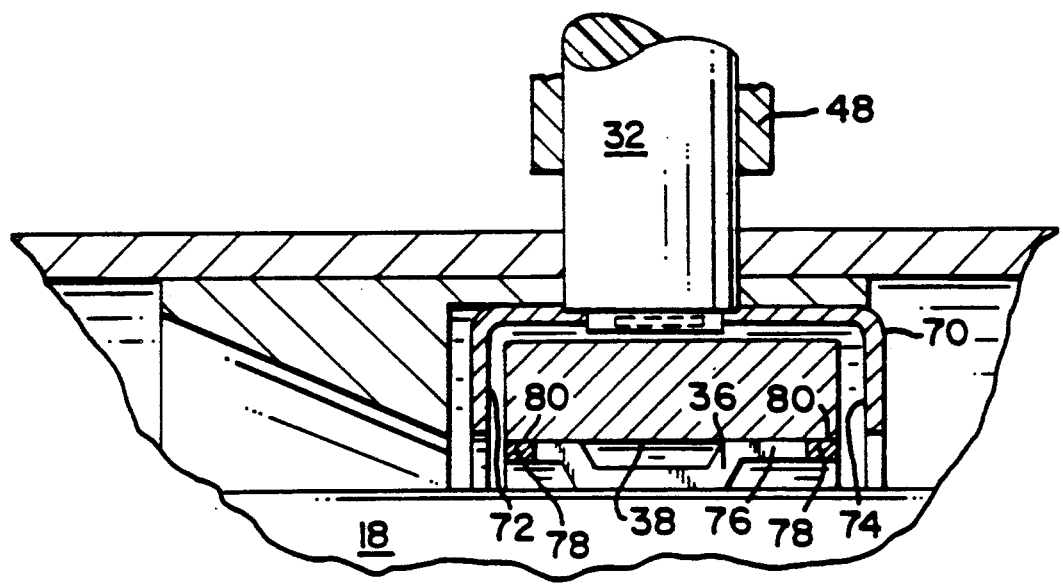
Figure 7:
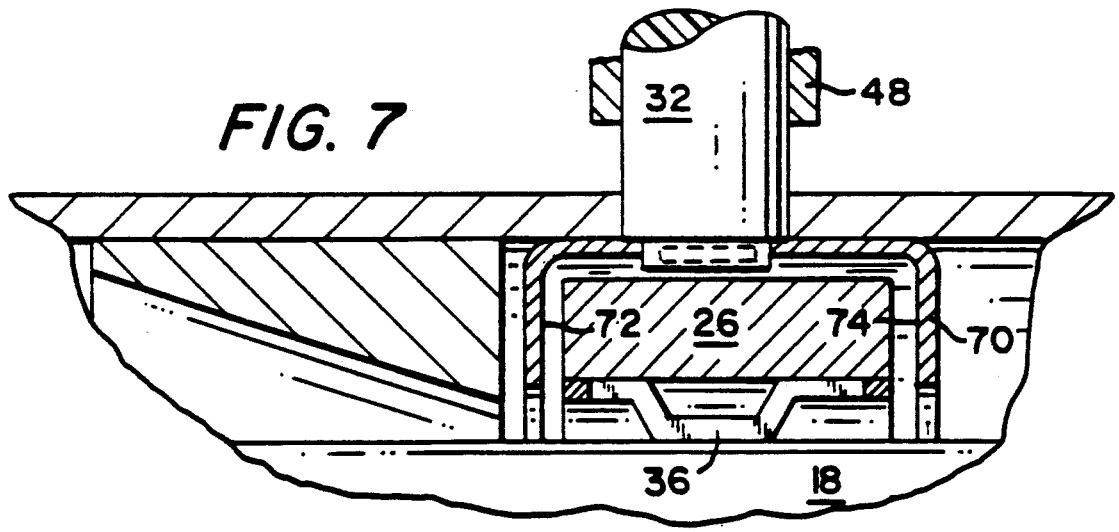
Figure 8:
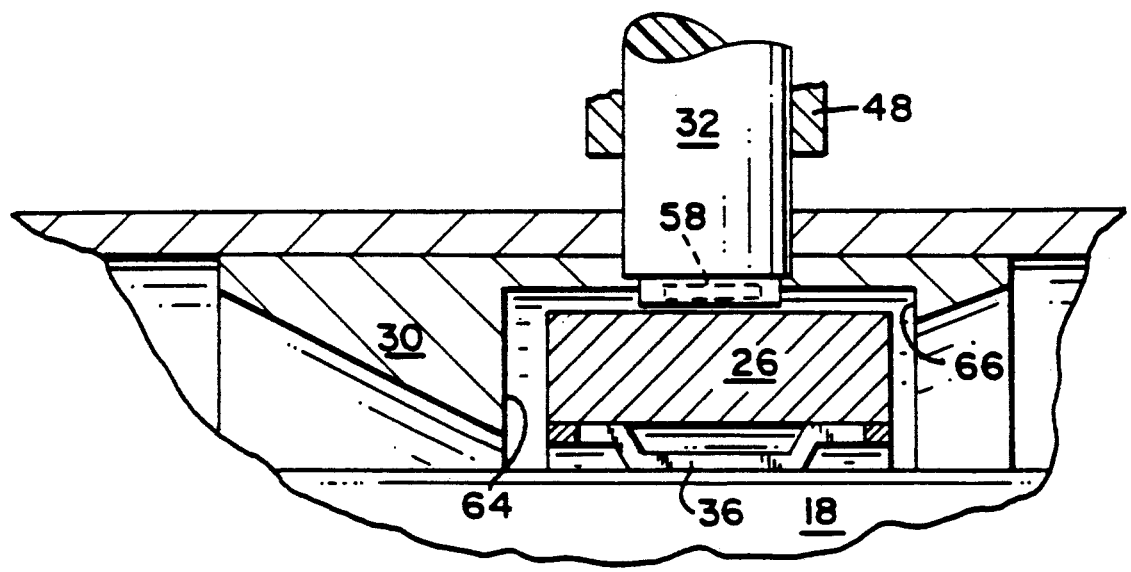

In FIGS. 4–8, a solid funnel member 30 is used. In these figures, there are several alternate end plate configurations which restrict axial movement of the target. In FIGS. 4,5 and 8, a funnel retainer face 64 is formed directly on the funnel 30. In FIG. 8, a second retainer face 66 is also formed as part of funnel member. Alternately, one of the faces may be formed by an L shaped cup 68 as shown in FIGS. 4 and 5, or else a single U shaped cup 70 may provide both faces 72 and 74 as shown in FIGS. 6 and 7.

Figure 3:
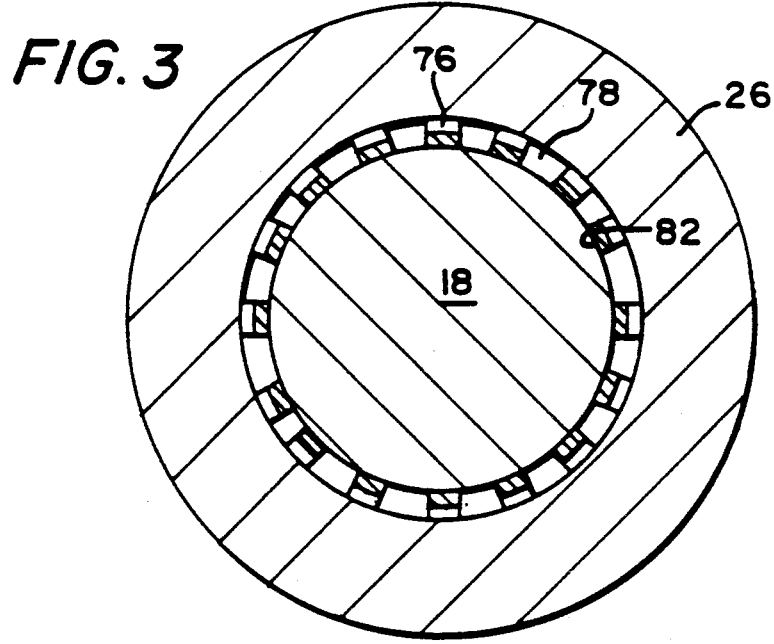
FIG. 3 is a sectional view taken along line 3—3 of FIG. 2.
Figure 2:
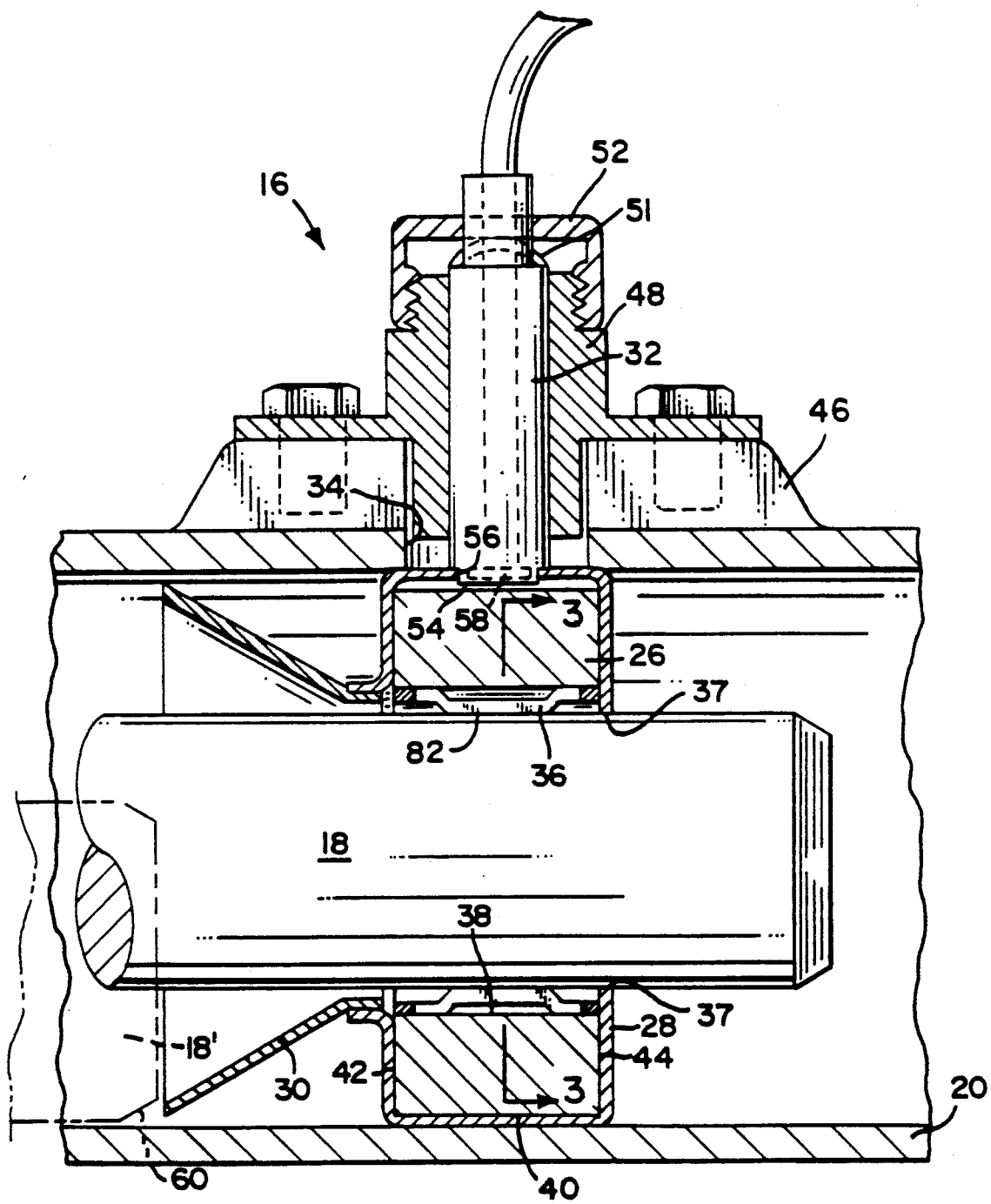
FIG. 2 is a cross sectional view of the sensor of FIG. 1 with the vehicle axle shown in phantom in the ready to insert position, and solidly in the inserted position.

The construction of the target retention sleeve 36 is shown in FIG. 3. Circumferentially separated cross bars 76 interconnect two axially spaced end rims 78. Surfaces 80 contact inner target surface 38. Radially inwardly extending flexible protrusions 82 exert a spring biased force against axle 18 when the axle is inserted into bore 37. The relaxed inside diameter of the protrusions 82 are normally less than the diameter of the rotatable shaft. However, the protrusions 82 are sufficiently flexible to securely grasp the inserted shaft.

FABRICATION

The primary function of the target retainer means 28 is to prevent the slippage of the target 26 from the correct axial position when the axle 18 is being positioned in the axle tube 20. In order to fabricate the entire assembly, the following procedure may be followed.

Initially, the bearings 22 are mounted inside the separated tube 20 and differential 24. The target assembly 26 is placed inside of the cup means 28, which is then placed inside the axle tube 20. The axle tube is then connected to the differential.

The axle is then fit through the bearings 22 and the bore 37 in the target retainer means 28. The funnel 30 will guide the axle into the bore and allow the end of the axle to be forced through the bore 37.

The sensor mount is thereupon mounted on the tube through the tube recess 34. In order to ensure proper functioning of the sensor 58, the sensor must be mounted closely adjacent the target 26. The housing is fastened to the bosses 46.

Having described the invention, what is claimed is:

1. An apparatus for determining parameters of relative rotation of a rotatable shaft mounted within a tube, comprising:
    a substantially annular shaped target;
    attachment means for attaching the target to the shaft to restrain relative rotation which permits axial movement therebetween;
    target retaining means for restraining axial movement of the target relative to the tube in both axial directions, the target retaining means being securely attached to an inner wall of the tube, the target being rotatable relative to said target retaining means;
    a sensor extending through a wall opening formed in the tube; and
    mounting means for mounting the sensor relative to the tube.

2. The apparatus as described in claim 1, wherein the target retaining means further comprises:
    two radially extending end faces.

3. The apparatus as described in claim 2 wherein the target retaining means further comprises:
    an outer periphery member connecting the two radially extending end faces.

4. The apparatus as described in claim 1, wherein the attachment means produces a frictional contact between the target and the shaft.

5. An apparatus for determining parameters of relative rotation of a rotatable shaft mounted within a tube, comprising:
    a substantially annular shaped target;
    attachment means for attaching the target to the shaft wherein relative rotation therebetween is restrained and axial movement in both axial directions therebetween is permitted;
    a target retainer having a radially extending end face located in close proximity to each axial end of the target;
    a sensor extending through a wall opening formed in the tube; and
    mounting means for mounting the sensor relative to the tube.

6. The apparatus as described in claim 5, wherein the target retainer further comprises:
    an outer periphery member connecting the two radially extending end faces.

7. The apparatus as described in claim 5, wherein the attachment means produces a frictional contact between the target and the shaft.

8. An apparatus for determining parameters of relative rotation of a rotatable shaft mounted within a tube having a wall opening comprising:
    a substantially annular shaped target affixed to said rotatable shaft;
    target retaining means for restricting axial motion of the target relative to the tube, the target retaining means having an aperture;
    A sensor including a foot portion and a sensor mount portion, the foot portion containing the sensor extending through the wall opening into the aperture, the sensor mount portion having a cross section at least equal to said aperture but no greater than said wall opening, the foot portion having a cross section no greater than the wall opening and the aperture; and
    mounting means for mounting the foot portion in the aperture.

9. The apparatus as described in claim 8, wherein the sensor mount portion contacts the target retaining means adjacent said aperture to position the foot portion relative to the target.

10. The apparatus as described in claim 8, further comprising:
    biasing means for biasing the foot portion into the aperture.

11. The apparatus as described in claim 8, further comprising:
    a spring directing the sensor into the aperture.

12. An apparatus for determining parameters of relative rotation of a rotatable shaft mounted within a tube having a wall opening comprising:
    a substantially annular shaped target which is affixed to said rotatable shaft;
    target retaining means for restricting axial motion of the target relative to the tube, the target retaining means having an aperture;
    a sensor extending through the opening and into the aperture of the target retaining means;

biasing means for biasing said sensor into the aperture of the target retaining means; and mounting means for mounting the sensor relative to the tube.

13. An apparatus comprising:

a stationary tube with an elongated inner tube wall formed therein;

a rotatable shaft disposed within the elongated inner tubular wall;

a substantially annular target connected to the rotatable shaft;

target retainer for restricting relative axial motion of the target relative to the tube, including an outer periphery and two end faces, the outer periphery conforming to the elongated inner tubular wall to restrict motion of the target retainer relative to the stationary tube, one end face is spaced from either end of the target;

a wall opening formed in the stationary tube;

an aperture formed in the outer periphery in alignment with the wall opening;

sensor means extending through the wall opening and into the aperture for sensing rotational parameters of the target; and mounting means for mounting the sensor means relative to the tube; and means for assisting in the insertion of the rotatable shaft into a bore formed in the target retainer, the means for assisting in the insertion of the rotatable shaft being funnel shaped.

14. The apparatus as described in claim 13, wherein the means for assisting in the insertion of the rotatable shaft is connected to the target retainer.

15. An apparatus for determining parameters of relative rotation of a rotatable shaft mounted within a stationary tube, comprising:

a substantially annular shaped target;

means for securely attaching the target to the rotatable shaft comprising a spring member having axially spaced end rims interconnected by circumferentially separated cross bars, each cross bar having a radially inwardly extending flexible protrusion, the inside diameter of the protrusion being normally less than the diameter of the rotatable shaft, but having sufficient flexibility to securely grasp the inserted shaft;

target retaining means having a bore for receiving the rotatable shaft, and dimensioned to be securely attached to an elongated inner wall of the tube, the target retaining means having a radially extending surface adjacent each axial end of the target to restrain axial displacement of the target, and also having an aperture adjacent the outer periphery of the target;

a sensor extending into the aperture; and means for mounting the sensor relative to the stationary tube.

16. A method for assembling a sensor system to measure relative angular position and rotation of a shaft located within a tube, including the steps of:

providing a target within a target retaining means;

aligning the target retaining means within the tube such that an aperture of the target retaining means is aligned with a wall opening of the tube;

positioning the shaft within the tube;

slidably affixing the target to the shaft wherein the target retaining means restricts axial motion between the target and the tube and limits axial displacement of the target relative to the shaft, the target and the shaft being freely rotatable within the target retaining means;

inserting the sensor through the wall opening and into the aperture such that the sensor is located within proximity of the target to sense position or rotation thereof; and mounting said sensor relative to said tube.

* * * * *